(12) United States Patent
Wonnemann et al.

(10) Patent No.: US 7,862,851 B2
(45) Date of Patent: Jan. 4, 2011

(54) PROCESS FOR COATING ELECTRICALLY CONDUCTIVE SUBSTRATES

(75) Inventors: Heinrich Wonnemann, Telgte (DE); Lars Hof, Münster (DE); Werner Blömer, Ochtrup (DE)

(73) Assignee: BASF Coatings AG, Munster (DE)

( * ) Notice: Subject to any disclaimer, the term of this patent is extended or adjusted under 35 U.S.C. 154(b) by 961 days.

(21) Appl. No.: 11/568,523

(22) PCT Filed: May 25, 2005

(86) PCT No.: PCT/EP2005/052407

§ 371 (c)(1),
(2), (4) Date: Oct. 31, 2006

(87) PCT Pub. No.: WO2005/120724

PCT Pub. Date: Dec. 22, 2005

(65) Prior Publication Data

US 2007/0224337 A1    Sep. 27, 2007

(30) Foreign Application Priority Data

Jun. 5, 2004   (DE) .................. 10 2004 027 650

(51) Int. Cl.
  *B05D 5/12*  (2006.01)
  *C09D 5/00*  (2006.01)
(52) U.S. Cl. .................. 427/58; 106/287.23; 204/488; 204/500; 204/507; 204/181.1; 204/181.7
(58) Field of Classification Search .............. 427/407.1, 427/58; 106/287.23; 204/488, 500, 507, 204/181.1, 181.7
See application file for complete search history.

(56) References Cited

U.S. PATENT DOCUMENTS

| | | | |
|---|---|---|---|
| 4,375,498 A | 3/1983 | Le Minez et al. | |
| 4,537,926 A | 8/1985 | Kivel et al. | |
| 4,761,212 A | 8/1988 | Watanabe et al. | |
| 4,804,581 A * | 2/1989 | Geary et al. ................. | 428/332 |
| 4,849,283 A | 7/1989 | Porter, Jr. et al. | |
| 5,507,928 A * | 4/1996 | Bohmert et al. ............ | 204/488 |
| 5,601,878 A | 2/1997 | Kranig et al. | |
| 6,512,026 B1 * | 1/2003 | Ott et al. ..................... | 523/409 |
| 2004/0132902 A1 * | 7/2004 | Bremser et al. ............. | 524/800 |

FOREIGN PATENT DOCUMENTS

| | | |
|---|---|---|
| DE | 4126476 A1 | 2/1992 |
| DE | 4125459 A1 | 2/1993 |
| DE | 4235778 A1 | 4/1994 |
| DE | 19512017 C1 | 7/1996 |
| DE | 19613547 A1 | 11/1996 |
| DE | 10027267 A1 | 12/2001 |
| DE | 10058860 A1 | 6/2002 |
| DE | 10126649 A1 | 12/2002 |
| DE | 102004027650 A1 | 1/2006 |
| EP | 0074634 A2 | 3/1983 |
| EP | 0192113 A2 | 8/1986 |
| EP | 0529335 A1 | 7/1992 |
| EP | 0505445 B1 | 9/1992 |
| EP | 0595186 A1 | 10/1992 |
| EP | 0525867 A1 | 3/1993 |
| EP | 0666779 B1 | 10/1993 |
| EP | 0639660 A1 | 2/1995 |
| EP | 0646420 A1 | 4/1995 |
| EP | 0742272 A1 | 11/1996 |
| EP | 0817648 B1 | 12/2004 |
| JP | 52065534 A | 5/1977 |
| WO | 9507322 A1 | 8/1994 |
| WO | WO98/07794 A1 | 1/1998 |
| WO | WO99/33889 A1 | 7/1999 |
| WO | WO99/46343 A1 | 9/1999 |

OTHER PUBLICATIONS

Cytec; Binder Resins, Hardeners and Additives; Product Guide—Powder Coating Resins Americas; pp. 4.
International Preliminary Report on Patentability for International application No. PCT/EP2005/052407 dated Dec. 28, 2006.

* cited by examiner

Primary Examiner—Michael Barr
Assistant Examiner—Ryan Schiro
(74) Attorney, Agent, or Firm—Cantor Colburn LLP

(57) ABSTRACT

A process for coating electrically conductive substrates by
(1) applying an electrocoat film to an electrically conductive substrate and curing it to give an electrocoat and then
(2) applying a layer of a pulverulent coating material to the electrocoat and curing it to give a powder coat
or alternatively
(1) applying an electrocoat film to an electrically conductive substrate and drying it without fully curing it,
(2) applying a layer of a pulverulent coating material to the dried electrocoat film(s) and
(3) jointly curing the dried electrocoat film and the layer of the pulverulent coating material to give the electrocoat and the powder coat
wherein the pulverulent coating material comprises
(A) at least one epoxy resin having a melting point, melting range or glass transition temperature>30° C.,
(B) at least one carboxyl-containing polyester resin having a melting point, melting range or glass transition temperature>30° C., and
(C) at least one polycarboxylic acid having a melting point of between 80 and 160° C.

16 Claims, No Drawings

PROCESS FOR COATING ELECTRICALLY CONDUCTIVE SUBSTRATES

CROSS REFERENCE TO RELATED APPLICATIONS

This application is a National Phase Application of Patent Application PCT/EP2005/052407 filed on 25 May 2005, which claims priority to 102004027650.1, filed 5 Jun. 2004.

FIELD OF THE INVENTION

This application claims the priority of DE 10 2004 027 650.1

The present invention relates to a new process for coating electrically conductive substrates by
(1) applying at least one electrocoat film to an electrically conductive substrate and curing it to give an electrocoat and then
(2) applying at least one layer of at least one pulverulent coating material to the electrocoat and curing it to give a powder coat or alternatively
(1) applying at least one electrocoat film to an electrically conductive substrate and drying it without fully curing it,
(2) applying at least one layer of at least one pulverulent coating material to the dried electrocoat film(s) and
(3) jointly curing the dried electrocoat film(s) and layer(s) of the pulverulent coating material or materials to give the electrocoat and the powder coats.

PRIOR ART

Thermally curable hybrid powder coating materials comprise familiarly epoxy resins and carboxyl-containing polyester resins as binders. They are termed hybrid powder coating materials on account of the two classes of binder that are processed here in a mixture. The ratio between epoxy resin and polyester resin in the mixture varies from 60:40 to 10:90. The precise ratio in the mixture is determined by the specific requirements of the application. The hybrid powder coating materials are thermally cured or baked in general in the temperature window from 150 to 220° C. The necessary times at substrate temperature are 20 minutes at 150° C. and less than 5 minutes at 220° C.

The hybrid powder coating materials yield coatings having outstanding mechanotechnological properties. Erichsen cupping to panel cracking and bending radii of T0 are not unusual. In the salt spray test scribe creep of <2 mm is found even after 2000 hours' exposure. The coatings are resistant to yellowing and their susceptibility to chalking is low. On account of their advantageous properties their application ranges from smooth priming powders for the cycle and vehicle industry through to enamel-effect powders for the household appliance industry. Radiators, computer housings, office furniture and electrical switchboxes too, however, are coated with hybrid powder coating materials.

(Cf. in this regard the BASF Coatings AG brochure "Pulverlacke—Pulverlacke für industrielle Anwendungen" [Powder Coatings—Powder Coating Materials for Industrial Applications], January 2000, or DE international patent applications WO 95/07322 A1 and WO 99/33889 A1).

These known hybrid powder coating materials are used first and foremost in coil coating processes, where they are applied to metal coils and cured. Subsequently the coated metal coils or parts thereof are brought into the desired shape by deep drawing, for example. Whether these hybrid powder coating materials give coatings having outstanding performance properties in combination with electrocoats as well is unknown.

European patent application EP 0 742 272 A1 discloses a process of the type referred to at the outset. It uses pulverulent coating materials or powder coating materials which comprise as binders polyesters, polyacrylate resins and epoxy resins. Crosslinking agents which can be used—depending on the complementary reactive functional groups present in the binders—include carboxylic anhydrides, amino resins, blocked polyisocyanates, diamines, imidazoles, dihydrazides or epoxides. The powder coating materials further comprise hydroxyl-containing, aliphatic or aromatic, crystalline compounds having a melting point of between 30° C. and 150° C. as leveling agents in combination with a conventional leveling agent.

The use of the hydroxyl-containing crystalline compounds does, however, have disadvantages. Thus during the thermal curing of the applied powder coating materials the compounds are predominantly not incorporated into the thermosetting three-dimensional network of the powder coatings but instead remain unchanged therein. They therefore tend frequently toward migration, leading to the formation of deposits on the powder coatings. The effects of this in turn include the reduction of the intercoat adhesion between the powder coatings and the further coatings present thereon. The condensation resistance of the multicoat paint systems may also suffer. All this can lead to delamination of the coats of the multicoat systems.

THE PROBLEM ADDRESSED BY THE PRESENT INVENTION

The object on which the present invention was based was therefore to find a new process for coating electrically conductive substrates by
(1) applying at least one electrocoat film to an electrically conductive substrate and curing it to give an electrocoat and then
(2) applying at least one layer of at least one pulverulent coating material to the electrocoat and curing it to give a powder coat or alternatively
(1) applying at least one electrocoat film to an electrically conductive substrate and drying it without fully curing it,
(2) applying at least one layer of at least one pulverulent coating material to the dried electrocoat film(s) and
(3) jointly curing the dried electrocoat film(s) and layer(s) of the pulverulent coating material or materials to give the electrocoat and the powder coat that no longer has the disadvantages of the prior art but instead provides coatings which exhibit particularly high intercoat adhesion between electrocoat and powder coat on the one hand and between powder coat and further, overlying coats on the other hand and a particularly high condensation resistance and which do not exhibit any delamination even after severe exposure to moisture, radiation and/or mechanical action. The coatings produced by means of the new process ought additionally to have all of the other advantages, outlined above, that are associated with the use of hybrid powder coating materials. The new process ought not least to provide the powder coatings in lower film thicknesses without loss of their particular advantages as a result.

THE SOLUTION PROVIDED BY THE INVENTION

The invention accordingly provides the new process for coating electrically conductive substrates by (1) applying at least one electrocoat film to an electrically conductive substrate and curing it to give an electrocoat and then
(2) applying at least one layer of at least one pulverulent coating material to the electrocoat and curing it to give a powder coat or alternatively
(1) applying at least one electrocoat film to an electrically conductive substrate and drying it without fully curing it,
(2) applying at least one layer of at least one pulverulent coating material to the dried electrocoat film(s) and
(3) jointly curing the dried electrocoat film(s) and layer(s) of the pulverulent coating material or materials to give the electrocoat and the powder coats wherein the pulverulent coating material comprises
(A) at least one epoxy resin having a melting point, melting range or glass transition temperature>30° C.,
(B) at least one carboxyl-containing polyester resin having a melting point, melting range or glass transition temperature>30° C., and
(C) at least one polycarboxylic acid having a melting point of between 80 and 160° C.

The new process for coating electrically conductive substrates is referred to below as "process of the invention".

Additional subject matter of the invention will emerge upon reading the description.

THE ADVANTAGES OF THE INVENTION

In the light of the prior art it was surprising and unforeseeable for the skilled worker that the object on which the present invention was based could be achieved by means of the process of the invention.

In particular it was surprising that the process of the invention no longer had the disadvantages of the prior art but instead yielded coatings which exhibited particularly high intercoat adhesion between electrocoat and powder coat on the one hand and between powder coat and further, overlying coats on the other and exhibited particularly high condensation resistance and showed no delamination even after severe exposure to moisture, radiation and/or mechanical action. The coatings produced by means of the new process also continued to exhibit all of the other advantages, depicted above, associated with the use of hybrid powder coating materials. The new process made it possible not least to provide the powder coats in lower film thicknesses without loss of their particular advantages as a result.

DETAILED DESCRIPTION OF THE INVENTION

The process of the invention serves for coating electrically conductive substrates.

The electrically conductive substrates have an electrically conductive surface so that the electrocoat materials can be deposited thereon conventionally by application of an electrical voltage. In the case of metallic substrates the electrical conductivity is given. In the case of nonmetallic substrates, such as substrates of plastics, for example, it can be brought about by coating the surface with metallic layers, electrically conductive organic polymers or coatings containing electrically conductive pigments.

The electrically conductive substrates are, in particular, bodies of means of transport, especially automobile bodies, and parts thereof, buildings and parts thereof, doors, windows, furniture, small industrial parts, and mechanical, optical and electronic components.

In electrodeposition coating, the electrically conductive substrates can be connected familiarly as anode or cathode. Preferably for purposes of cathodic electrodeposition coating they are connected as the cathode.

The electrocoat materials are preferably applied in wet film thicknesses which after curing of the electrocoat films result in electrocoats having film thicknesses of from 10 to 60, preferably from 15 to 50 and in particular from 15 to 40 μm.

Examples of suitable electrocoat materials are described in Japanese patent application 1975-142501 (Japanese laid-open specification JP 52-065534 A2, Chemical Abstracts No. 87: 137427) or in the patents and patent applications U.S. Pat. Nos. 4,375,498 A1, 4,537,926 A1, 4,761,212 A1, EP 0 529 335 A1, DE 41 25 459 A1, EP 0 595 186 A1, EP 0 074 634 A1, EP 0 505 445 A1, DE 42 35 778 A1, EP 0 646 420 A1, EP0 639 660A1, EP0 817 648A1, DE195 12 017 C1, EP0 192 113A2, DE 41 26 476 A1 or WO 98/07794.

In the process of the invention it is preferred to apply only one electrocoat film.

Immediately following its application the electrocoat film is thermally cured to give the electrocoat. Thereafter the electrocoat is coated with at least one, especially one, pulverulent coating material or powder coating material.

Alternatively the electrocoat film is dried without being fully cured and is subsequently coated with at least one, especially one, powder coating material, after which the electrocoat film and the powder coating film are jointly cured. Surprisingly it is possible by this means to reduce the film thicknesses of the powder coats without detriment to the profile of performance properties of the coatings.

For the process of the invention it is essential that at least one, especially one, thermally curable, pulverulent coating material or powder coating material is used which comprises at least one epoxy resin (A) having a melting point, melting range or glass transition temperature>30° C., preferably >40° C., in particular ≧50° C.

Suitable epoxy resins (A) include all conventional epoxy resins such as are commonly used for preparing hybrid powder coating materials.

Examples of suitable epoxy resins are known from patent applications
 WO 95/07322 A1, page 6 line 22 to page 8 line 6,
 WO 99/33889 A1, page 4 line 26 to page 7 line 28, or
 WO 99/46343 A1, page 8 line 7 to page 11 line 9.

It is preferred to use epoxy resins (A) based on bisphenol A, having an epoxy equivalent weight of from 500 to 1000 g/equivalent preferably and from 600 to 900 g/equivalent in particular. The epoxy resins (A) are commercial products and are sold for example by Huntsman under the brand name Araldit® GT 6063.

The epoxy resin (A) content of the powder coating material may vary very widely and is guided by the requirements of the case in hand. Based in each case on the powder coating material, the amount is preferably from 30 to 70% and in particular from 40 to 60% by weight.

The powder coating material comprises at least one polyester resin (B) having a melting point, melting range or glass transition temperature>30° C., preferably >40° C., in particular ≧50° C.

Suitable polyester resins (B) include all conventional polyesters resins such as are normally used for preparing hybrid powder coating materials. They are preferably polyester resins having an acid number of from 25 to 100, in particular from 30 to 80, mg KOH/g.

Examples of suitable polyester resins (B) are known from patent applications
 WO 95/07322 A1, page 4 line 24 to page 6 line 9, and
 WO 99/33889 A1, page 7 line 29 to page 8 line 23.

It is preferred to use at least two, in particular two, polyester resins (B) differing in acid number, in order to set the acid number of the constituent (B) in the range described above.

The polyester resins (B) are commercial products and are sold for example by UCB under the brand name Alftalat® AN 722 or 783.

The amount of polyester resins (B) in the powder coating material may vary very widely and is guided by the requirements of the case in hand, in particular by the nature and number of the complementary reactive functional groups in the epoxy resins (A). Based in each case on the powder coating material, the amount is preferably from 15 to 75% and in particular from 20 to 60% by weight.

The powder coating material comprises at least one, especially one, polycarboxylic acid (C) having a melting point of between 80 and 160° C. and in particular between 90 and 155° C.

The polycarboxylic acid (C) is preferably selected from the group consisting of saturated and unsaturated, in particular saturated, aliphatic, cycloaliphatic and aliphatic-cycloaliphatic, in particular aliphatic, polycarboxylic acids.

The polycarboxylic acids (C) are preferably selected from the group consisting of malonic acid, glutaric acid, adipic acid, pimelic acid, suberic acid, azelaic acid, sebacic acid, 1,11-undecanedioic acid, 1,12-dodecanedioic acid, 1,13-tridecanedioic acid, 1,14-tetradecanedioic acid, 1,15-hexadecanedioic acid, 1,20-eicosanedioic acid, 1,22-docosanedioic acid and hexanetricarboxylic acid. And in particular 1,12-dodecanedioic acid is used.

The polycarboxylic acids (C) may contain minor amounts of at least one monocarboxylic acid having a melting point of between 80 and 160° C. and in particular between 90 and 155° C. provided that they do not form any low-melting eutectics with the polycarboxylic acids (C). "Minor amount" means that the monocarboxylic acid accounts for not more than 40% by weight, preferably not more than 30% by weight and in particular not more than 10% by weight of the total amount of polycarboxylic acid (C) and monocarboxylic acid. Examples of suitable monocarboxylic acids are salicylic acid and benzoic acid.

The amount of the polycarboxylic acids (C) in the powder coating material, based in each case on the powder coating material, is preferably from 0.5 to 10% by weight and in particular from 2 to 6% by weight. The acids can be present as a separate phase (C) alongside the powder coating particles. Alternatively some of the polycarboxylic acids (C) are in the powder particles and the remainder are in the form of a separate phase (C). Preferably all of the polycarboxylic acids (C) are in the powder coating particles.

Surprisingly the polycarboxylic acids (C) act as leveling agents for the powder coating material, despite the fact that they react with the epoxy resins (A) and are incorporated into the thermosetting, three-dimensional network of the coatings that is formed from the powder coating material in the course of thermal curing or baking.

The amounts of the constituents (A), (B) and (C) are preferably chosen such that the equivalent ratio of carboxyl groups to epoxy groups is from 0.55 to 1.2, in particular from 0.55 to 0.99.

The powder coating material may further comprise at least one additive (D) such as is commonly used in powder coating materials. Examples of suitable additives are described in detail in the German patent applications DE 196 13 547 A1, column 3 lines 25 to 52, DE 100 27 267 A1, page 11, para [0106] to page 12 para [0107], DE 101 26 649 A1, page 17 para [0174] to page 18 para [0189], or DE 100 58 860 A1, page 4 para [0037] to page 8 para [0055].

The powder coating material may also be pigmented and comprise conventional color and/or effect pigments. Examples of suitable pigments are described in detail in German patent application DE 100 58 860 A1, page 8 para [0056] to page 9 para [0067].

The preparation of the powder coating material has no special features as far as its method is concerned but can instead be carried out with the aid of the conventional methods.

By way of example the constituents of the powder coating material can be mixed with one another in conventional mixing equipment such as extruders. After they have solidified, the resulting mixtures are comminuted by means of conventional grinding equipment and if desired are classified.

The powder coating material can also be prepared by mixing the constituents by means of melt emulsification, cooling the melt and isolating the suspended particles (cf. German patent application DE 101 26 649 A1).

The particle size distribution of the powder coating material may vary comparatively widely and is guided by the particular end use. Preferably the particle size distribution is comparatively narrow with only a very low fraction of oversize (particle sizes above 95 μm) and of undersize (particle sizes below 5 μm). It is also possible to use a powder coating material having the particle size distribution described in European patent EP 0 666 779 B1.

The application of the powder coating material to the electrocoat or electrocoat film has no special features as far as its method is concerned but instead takes place with the aid of conventional methods and apparatus (cf. BASF Coatings AG brochure, "Pulverlacke—Pulverlacke für industrielle Anwendungen", January 2000).

The curing of the electrocoat films and of the powder coating films has no special features as far as its method is concerned but instead takes place by means of the customary apparatus and methods, particularly using IR radiation, NIR radiation and/or hot air, preference being given to the use of conventional radiant heaters and forced-air ovens. It is preferred to cure the electrocoat films and powder coating films at temperatures>150° C., in particular >170° C. In the course of curing it is preferred not to exceed temperatures of 200° C., in particular 190° C.

The process of the invention yields coatings which even at high film thicknesses exhibit outstanding leveling and do not show any surface defects or any blushing after moisture exposure. The coatings have outstanding mechanotechnological properties and are particularly smooth. They are chemically resistant, stable to weathering and resistant to yellowing, and their susceptibility to chalking, if present at all, is very low. Furthermore the coatings can be overcoated without problems, which is of great significance for automotive refinish, for example.

The process of the invention, however, also has a further, unexpected advantage. Thus parts made of plastic which are intended for exterior surface mounting and have been appropriately pretreated can be incorporated into the substrates and coated with the pulverulent coating material as soon as the electrically conductive substrates have been electrocoated, particularly the automobile bodies, and this overall provides for significant simplification and shortening of the coating process.

EXAMPLES

Examples 1 to 5 (Inventive) and C1 (Comparative)

The Preparation of Hybrid Powder Coating Materials 1 to 5 of Examples 1 to 4 and of Hybrid Powder Coating Material C1 of Example C1 and Production of Coatings 1 to 5 and C1 Therefrom The constituents of the hybrid powder coating materials 1 to 5 and of the comparative example C1 were mixed in a Henschel fluid mixer and extruded in a BUSS PLK 46 extruder. The resulting extrudate chips were ground on a Neumann & Esser ICM 2.4 mill. The resulting ground material was sieved through a 100 μm ultrasound sieve. Table 1 gives an overview of the physical composition of the hybrid powder coating materials 1 to 5 and C1 and of their key performance properties. In Example 5, the process measures were varied (cf. the comments in Table 1).

coating material on an aluminum panel inclined at 60° in the course of baking at 175° C. In this test glass plates were used originally but their thermal conduction was unfavorable.

Additionally the hybrid powder coating materials 1 to 5 had significantly longer gel times than the hybrid powder coating material C1.

TABLE 1

The physical composition of the hybrid powder coating materials 1 to 5 (Inventive Examples 1 to 5) and C1 (Comparative Example C1) and key performance properties

| Constituent and property | Examples (% by weight) | | | | | |
|---|---|---|---|---|---|---|
| | C1 | 1 | 2 | 3 | 4 | 5 |
| Epoxy resin (A): | | | | | | |
| Araldit GT ® 6063 (Huntsman Vantico) | 43.5 | 42.04 | 44.34 | 42.04 | 44.42 | 44.43 |
| Polyester resin (B): | | | | | | |
| Alftalat ® AN 722 | 43.6 | 42.29 | 39.9 | 21.27 | 20.08 | 39.9 |
| Alftalat ® AN 783 | — | — | — | 21.02 | 19.83 | — |
| 1,12-Dodecanedioic acid (C) | — | 2.62 | 2.62 | 2.62 | 2.62 | — |
| Additives (D): | | | | | | |
| Lutonal ® A 25 (leveling agent from BASF Aktiengesellschaft) | 1 | 1 | 1 | 1 | 1 | 1 |
| BYK ® 361 N (additive from BYK Chemie) | 1 | 1 | 1 | 1 | 1 | 1 |
| Titanium rutile 2310 | 10 | 10 | 10 | 10 | 10 | 10 |
| Pigment-grade carbon black FW 200 | 0.05 | 0.05 | 0.05 | 0.05 | 0.05 | 0.5 |
| Benzoin | 0.6 | 0.6 | 0.6 | 0.6 | 0.6 | 0.6 |
| Licowax ® R 21 (wax from Clariant) | 0.1 | 0.1 | 0.1 | 0.1 | 0.1 | 0.1 |
| Aerosil ® 200*⁾ (pyrogenic silica from Degussa) | 0.3 | 0.3 | 0.3 | 0.3 | 0.3 | 0.3 |
| 1,12-Dodecanedioic acid (C)**⁾ | — | — | — | — | — | 2.62 |
| Properties: Particle size distribution (Malvern ® 2000; atomizer: 4 bar pressure)(%): | | | | | | |
| <10 μm | 9.11 | 8.89 | 9.49 | 8.47 | 8.54 | 7.22 |
| <50 μm | 88.8 | 88.47 | 89.14 | 87.5 | 87.9 | 94.39 |
| <60 μm | 95.34 | 95.15 | 95.62 | 94.59 | 94.86 | 98.78 |
| <70 μm | 96.65 | 98.58 | 98.84 | 98.31 | 98.46 | 99.99 |
| <90 μm | 99.99 | 99.98 | 100 | 99.95 | 99.97 | 100 |
| D [4.3] (%) | 29.53 | 29.8 | 29.33 | 30.51 | 30.25 | 26.21 |
| Span | 1.48 | 1.48 | 1.48 | 1.46 | 1.46 | 1.37 |
| Sieve residue >63 μm (%) | 0.5 | 0.55 | 0.5 | 0.5 | 0.5 | 0.1 |
| Viscosity minimum: | | | | | | |
| T (° C.) | 151 | 153 | 153 | 152 | 154 | 153 |
| [η*] (Pa s) | 26.2 | 19.6 | 15.8 | 19.3 | 17.4 | 16.5 |
| GPF ᵃ⁾ (cm) | 9.3 | 12 | 14 | 13.2 | 14.1 | 15.5 |
| Gel time at 220° C. (s) | 73 | 85 | 92 | 110 | 126 | 90 |

Process measures:
*⁾The item is admixed with the extrudate chips prior to the grinding.
**⁾The item is admixed using a Henschel fluid mixer after the grinding a) Glass Plate Flow Test The hybrid powder clear coat materials 1 to 5 and C1 exhibited very good storage stability, pourability and fluidizability and were therefore very easy to store, transfer and apply.

In the GPF, however, the hybrid powder coating materials 1 to 5 had a significantly better pourability than the hybrid powder coating material C1. The GPF served as an indicator of viscosity and reactivity of a powder coating material. The parameter measured was the distance traveled by a powder In addition the hybrid powder coating material C1 in its viscosity minimum (T: 151 to 154° C.) had a significantly higher viscosity than the hybrid powder coating materials 1 to 5.

The hybrid powder coating materials were applied conventionally in a powder coating unit electrostatically to steel panels which had been coated with a cathodic electrodeposition coating, the powder coating materials being applied such that baking thereof at 175° C. for 25 minutes gave coatings 1 to 5 and C1 having film thicknesses of between 35 and 75 μm.

The evenness of the coatings was measured with the aid of the wave-scan DOI instrument from BYK-Gardner in the measurement range Wd (3 to 10 mm). The Wd values measured were plotted as a function of the film thicknesses. The resultant plots were used to determine the respective Wd values for film thicknesses 50 and 60 μm. Table 2 gives an overview of these Wd values.

TABLE 2

The evenness of coatings 1 to 5 (Examples 1 to 4) and C1 (Example C1)

| Wave scan DOI | Examples | | | | | |
|---|---|---|---|---|---|---|
| Wd value at | C1 | 1 | 2 | 3 | 4 | 5 |
| 60 μm | 26 | 22 | 21 | 21 | 20 | 16 |
| 50 μm | 28.5 | 24.5 | 24 | 24.5 | 23 | 20 |

The Wd values underscored the fact that coatings 1 to 5 had a significantly better evenness than coating C1.

The invention claimed is:

1. A process for coating electrically conductive substrates by
   (1) applying at least one electrocoat material to an electrically conductive substrate and curing it to give an electrocoat and subsequently
   (2) applying at least one layer of at least one pulverulent coating material to the electrocoat and curing it to give a powder coat
   or alternatively
   (1) applying at least one electrocoat material to an electrically conductive substrate and drying it without fully curing it to provide a dried electrocoat film,
   (2) applying at least one layer of at least one pulverulent coating material to the dried electrocoat film and
   (3) jointly curing the dried electrocoat film and layer of the pulverulent coating material to give an electrocoat and a powder coat,
   wherein the pulverulent coating material comprises
   (A) at least one epoxy resin having at least one of a melting point, melting range or glass transition temperature that is greater than 30° C.,
   (B) at least one carboxyl-containing polyester resin having at least one of a melting point, melting range or glass transition temperature that is greater than 30° C., and
   (C) at least one polycarboxylic acid having a melting point of between 80 and 160° C.

2. The process of claim 1, wherein based on its total amount, the pulverulent coating material comprises the polycarboxylic acid (C) in an amount of from 0.5 to 10% by weight.

3. The process of claim 2, wherein based on its total amount, the pulverulent coating material comprises the polycarboxylic acid (C) in an amount of from 2 to 6% by weight.

4. The process of claim 1, wherein the polycarboxylic acid (C) is selected from the group consisting of malonic acid, sebacic acid, 1,11-undecanedioic acid, 1,12-do decanedioic acid, 1,13-tridecanedioic acid, 1,14-tetradecanedioic acid, 1,16-hexadecanedioic acid, 1,20-eicosanedioic acid, 1,22-docosanedioic acid and hexanetricarboxylic acid.

5. The process of claim 4, wherein the polycarboxylic acid (C) is 1,12-dodecanedioic acid.

6. The process of claim 1, wherein based on its total amount, the pulverulent coating material comprises from 30 to 70% by weight of epoxy resin (A).

7. The process of claim 1, wherein the epoxy resin (A) has at least one of a melting point, melting range or glass transition temperature that is greater than 40° C.

8. The process of claim 1, wherein epoxy resin (A) comprises a bisphenol A epoxy resin.

9. The process of claim 1, wherein based on its total amount, the pulverulent coating material comprises from 15 to 75% by weight of polyester resin (B).

10. The process of claim 1, wherein the polyester resin (B) has at least one of a melting point, melting range or glass transition temperature that is greater than or equal to the melting point of polycarboxylic acid (C).

11. The process of claim 1, wherein the polyester resin (B) has an acid number of from 25 to 100 mg KOH/g.

12. The process of claim 11, wherein the polyester resin (B) comprises an acid number of from 25 to 100 mg KOH/g and at least two polyester resins (B) having different acid numbers.

13. The process of claim 1, wherein the electrocoat material is a cathodically depositable electrocoat material.

14. The process of claim 1, wherein the electrically conductive substrates comprise at least one of bodies of means of transport and parts thereof, buildings and parts thereof, doors, windows, furniture, small industrial parts, and mechanical, optical and electronic components.

15. The process of claim 1, further comprising incorporating a plastic part into the electrically conductive substrate after the application of the electrocoat material and prior to the application of the pulverulent coating material.

16. The process of claim 1, wherein the weight ratio of the epoxy resin to the carboxyl-containing polyester resin is 60:40 to 10:90.

* * * * *